June 19, 1962  H. W. DIETERT ETAL  3,040,251
MEASURING AND INDICATING APPARATUS FOR USE
IN CONTROLLING THE ADDITION OF MOISTURE TO
SOLID GRANULAR MATERIAL
Filed Jan. 13, 1958
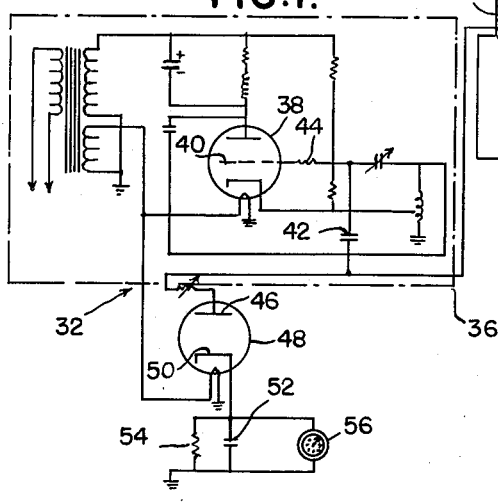
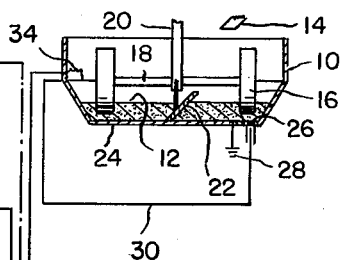
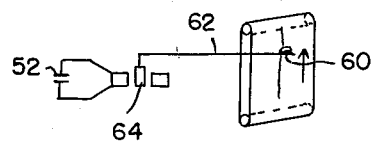
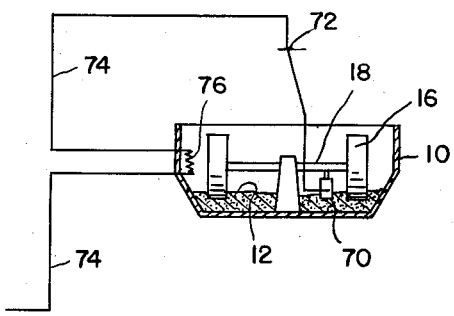
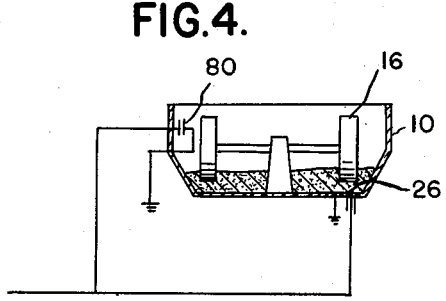
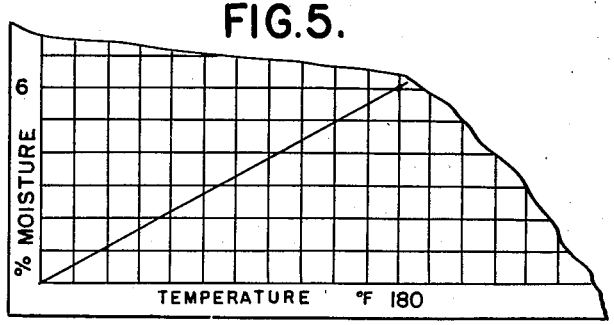
*INVENTORS*
HARRY W. DIETERT
RANDOLPH L. DIETERT
BY *Whittemore,*
*Hulbert & Belknap*
ATTORNEYS

United States Patent Office 3,040,251
Patented June 19, 1962

3,040,251
MEASURING AND INDICATING APPARATUS FOR USE IN CONTROLLING THE ADDITION OF MOISTURE TO SOLID GRANULAR MATERIAL
Harry W. Dietert and Randolph L. Dietert, both of Detroit, Mich., assignors to Harry W. Dietert Co., Detroit, Mich., a corporation of Michigan
Filed Jan. 13, 1958, Ser. No. 708,622
5 Claims. (Cl. 324—65)

The present invention relates to measuring and indicating apparatus for use in controlling the addition of moisture to solid granular material.

It is an object of the present invention to provide apparatus capable of accurately measuring the moisture content of solid granular material such for example as sand, and giving a steady indication of the moisture content.

It is a further object of the present invention to provide moisture measuring and indicating apparatus including means for taking a succession of moisture content readings at short intervals, and indicating means connected to the measuring means including means for providing a substantially steady indication of moisture content.

More specifically, it is an object of the present invention to provide means for measuring the moisture content of solid granular material such as sand in a mixer or muller including a moisture sensitive element exposed at the inner surface of a wall of the mixer or muller, in combination with means for alternately compressing a specimen of moist material against the moisture sensitive element and thereafter removing the specimen preparatory to compressing a subsequent specimen against the element, in combination with indicating means operable to indicate the preceding moisture content value until a following reading of the moisture content is taken and impressed thereon.

Still more specifically, it is an object of the present invention to provide moisture measuring means including a moisture sensitive element effective to develop an electrical characteristic, an oscillator circuit including a vacuum tube having a grid upon which the electrical characteristic is periodically impressed, a rectifier connected to said oscillator, a condenser connected to said rectifier and adapted to remain charged for a substantial period, and an indicating instrument of voltmeter type connected across the condenser.

Other objects and features of the invention will become apparent as the description proceeds, especially when taken in conjunction with the accompanying drawing, illustrating preferred embodiments of the invention, wherein:

FIGURE 1 is a view partly diagrammatic and partly in section illustrating the apparatus of the present invention.

FIGURE 2 is a fragmentary diagrammatic view showing a recording attachment for the system.

FIGURE 3 illustrates a modification of the moisture sensitive equipment.

FIGURE 4 illustrates yet another modification of the moisture sensitive equipment.

FIGURE 5 illustrates a portion of a chart usable in conjunction with the indicating means of the present invention.

The present invention is useful generally in producing solid granular material having a predetermined desired moisture content. By way of specific example, the granular material may be foundry sand which is moistened to give it the required consistency for use in the foundry. The actual desired moisture content of sand as prepared in the mill is variable in accordance with temperature which may vary substantially since in some cases molds are broken up and hot sand is returned and mixed with the sand in a hopper for re-use. Accordingly, the present invention contemplates compensating for temperature in one of two ways. In the first place, a chart may be provided showing the required sand moisture content for a particular temperature. Secondly, temperature compensation may be provided in the measuring system.

Referring first to FIGURE 1 there is illustrated a sand mixer mill or muller 10 having a quantity of sand therein indicated at 12 and having a water discharge nozzle 14 in position to add water to the mill. Within the mill are provided a pair of relatively heavy wheels or rollers 16 on an axle or shaft 18 carried by a vertically extending drive shaft 20. Conveniently, scraper blades 22 may be provided to follow around between the rollers 16 for a purpose which will presently appear.

Located in a wall of the mill 10, and preferably in the bottom wall 24 thereof in position to be passed over by the rollers 16 and the scraper 22, is a moisture sensitive probe element 26. This probe element may be of the type disclosed in our prior copending application Serial No. 674,822, filed July 29, 1957, now Patent No. 2,886,868, and comprises essentially an electrically conducting element insulated from other electrical conducting elements which are grounded as indicated at 28. The first element is connected by means of a coaxial cable 30 to a measuring and indicating system indicated generally at 32. In the form of the invention illustrated in FIGURE 1, the cable 30 is also connected to a temperature compensating resistance element 34 herein shown as provided in series with the variable capacitance constituted by the probe 26. The equipment included within the dot and dash line 36 is an oscillator which may for example be of the Hartley type and includes a triode 38 such for example as a 6SN7 tube having a grid 40 connected through a condenser 42 and resistance 44 to the line 30. Accordingly, the output of the oscillator is a function of the bias imparted to the grid 40 and this in turn is a function of combined moisture content and temperature of the sand 12 in the mill 10.

The output of the oscillator is connected to the plate 46 of a rectifier such for example as a 6H6 tube indicated at 48. The cathode 50 of the tube is connected to ground through a condenser 52 which may be, for example, an 18 mfd. condenser having a resistance 54 connected in parallel therewith, the resistance having a value as for example of about 2000 ohms. Connected across the condenser 52 is an indicator 56 which may be in the form of a voltmeter whose full scale reading may for example be 250 volts. The indicating instrument of course is calibrated not in volts but in percentage moisture.

During mixing of the sand it wil be appreciated that as each of the rollers 26 passes over the moisture sensitive element of the probe 26, a moist specimen of sand is compressed against the probe giving a maximum reading. Following the reading the moisture sensitive element is traversed by the plow or scraper 22 and the compressed moist sample removed. Shortly thereafter the succeeding roller compresses a second moist specimen against the probe. Accordingly, a succession of readings are taken at intervals dependent on the speed of rotation of the shaft 20 which is driven at substantial speed to effect efficient mulling of the sand.

At each traverse of a roller over the pressure sensitive element, the output of the oscillator circuit reaches a maximum which is transmitted as direct current pulses by the rectifier to the condenser 52 charging the same. The constants are selected such that the condenser remains charged without appreciable leakage for an interval sufficient to maintain the needle of the indicator 56 substantially constant between successive moisture content readings.

The operator will observe the moisture content as measured on the indicator 56 and will add water by a manually controlled valve through the nozzle 14 until the proper moisture content is reached. Obviously, the rate at which the moisture is added may be controlled so that as the moisture content approaches the required value the rate of addition of water may be slower.

Referring now to FIGURE 5 the system may omit the temperature sensitive resistance 34 and a separate thermocouple or temperature responsive element may be provided to give a direct reading of the temperature of the sand, preferably before the addition of water, which of course cools the sand. If for example it is found that the temperature of the sand before addition of water is 180 degrees, the operator merely notes that at 180 degrees for example, the required moisture content is six percent and will thereafter govern the addition of water suitably to bring the indicated moisture content to six percent on the indicator 56.

Referring now to FIGURE 2 there is indicated an arrangement in which the charged condenser 52 may be used to actuate a pen 60 which is carried on a movable arm 62 which may be the movable arm of an indicating instrument of the voltmeter type connected for example to an armature 64.

Referring now to FIGURE 3 the moisture sensitive element may be mounted on a paddle or plow 70 carried by the shaft 18 of the mill 10 and adapted to be moved through the sand 12 as it is mixed by the rollers 16. In this case of course a commutator joint such as diagrammatically suggested at 72 will be provided so that the capacitance reading variable in accordance with moisture content may be transmitted through a conductor 74. In this figure the capacitance reading of the probe mounted on the plow 70 is shown as combined in series relation with a temperature variable resistance 76. The line 74 leads to the grid 40 of the triode 38 as before.

Referring now to FIGURE 4 there is illustrated another variation of the invention in which the moisture sensitive probe may be the same as indicated at 26 in FIGURE 1 but in this case the variable capacity output thereof is combined in parallel relationship with the output of a temperature sensitive condenser indicated at 80. Again, the combined output of the temperature and moisture responsive devices is applied to the control grid 40 of the tube 38.

The present invention is extremely simple and yet provides quick and accurate control of the addition of moisture to bring the solid granular material such as sand, to exactly the required moisture content for best results.

The drawing and foregoing specification constitute a description of the improved measuring and indicating apparatus for use in controlling the addition of moisture to solid granular material in such full, clear, concise and exact terms as to enable any person skilled in the art to practice the invention, the scope of which is indicated by the appended claims.

What we claim as our invention is:

1. Apparatus for mixing a granular material such as sand with a liquid to produce a mixture having a required moisture content comprising a mill for receiving the granular material, means for adding water to the mill, an electrical moisture sensitive element exposed in a wall of said mill, members movable within said mill and operable to compress a moist specimen of granular material against said moisture sensitive element at intervals to produce periodic variations in the electrical properties of the moisture sensitive element representative of the moisture in the granular material which variations are produced at substantially constant conditions, other members movable within said mill to remove a compressed specimen from said element between successive operations of said first members whereby each said periodic variation is distinct and independent, an indicator, and circuit means connected between said indicator and element for providing a substantially accurate indication of the moisture content of the granular material as determined by the most recent compression of a specimen against said element to serve as a guide to govern admission of liquid to said mill, said circuit means including a condenser connected in parallel with said indicator and having a rate of decay sufficiently slow to maintain said indicator at a substantially constant reading between successive compressions of a specimen of granular material, and means for charging said condenser each time a specimen of granular material is compressed against the moisture sensitive element.

2. Apparatus for mixing a granular material such as sand with a liquid to produce a mixture having a required moisture content comprising a mill for receiving the granular material, means for adding water to the mill, an electrical moisture sensitive element exposed in a wall of said mill, members movable within said mill and operable to compress a moist specimen of granular material against said moisture sensitive element at intervals to produce periodic variations in the electrical properties of the moisture sensitive element representative of the moisture in the granular material which variations are produced at substantially constant conditions, other members movable within said mill to remove a compressed specimen from said element between successive operations of said first members whereby each said periodic variation is distinct and independent, an indicator, and circuit means connected between said indicator and element for providing a substantially accurate indication of the moisture content of the granular material as determined by the most recent compression of a specimen against said element to serve as a guide to govern admission of liquid to said mill, said circuit means including a condenser connected in parallel with said indicator and having a rate of decay sufficiently slow to maintain said indicator at a substantially constant reading between successive compressions of a specimen of granular material, and means for charging said condenser each time a specimen of granular material is compressed against the moisture sensitive element, and a temperature responsive electrical device exposed to the moist granular material in said container for correcting said indication for different granular material temperatures.

3. Apparatus for mixing a granular material such as sand with a liquid to produce a mixture having a required moisture content comprising a mill for receiving the granular material, means for adding water to the mill, an electrical moisture sensitive element exposed in a wall of said mill, members movable within said mill and operable to compress a moist specimen of granular material against said moisture sensitive element at intervals to produce periodic variations in the electrical properties of the moisture sensitive element representative of the moisture in the granular material which variations are produced at substantially constant conditions, other members movable within said mill to remove a compressed specimen from said element between successive operations of said first members whereby each said periodic variation is distinct and independent, and means for providing a substantially accurate indication of the moisture content of the granular material as determined by the most recent compressions of a specimen against said element to serve as a guide to govern admission of liquid to said mill, including an oscillator having a tank circuit, a rectifier connected in the tank circuit having a plate and cathode, a connection between the plate of said rectifier and ground potential through the moisture sensitive element, a condenser in series with the cathode of said rectifier, and an indicator in parallel circuit with said condenser, said condenser having a rate of decay sufficiently slow to maintain said indicator at a substantially constant reading between successive compressions of a specimen of granular material against said element.

4. Structure as set forth in claim 3 and further including a temperature responsive element maintained at substantially the temperature of the granular material in series with the plate of the rectifier and the moisture sensitive element.

5. Structure as set forth in claim 3 wherein said oscillator includes a control grid and another condenser in series with said control grid and said rectifier is more specifically connected between the ground potential and said another condenser.

References Cited in the file of this patent

UNITED STATES PATENTS

| | | |
|---|---|---|
| 1,686,365 | Becker | Oct. 2, 1928 |
| 2,251,641 | Stein | Aug. 5, 1941 |
| 2,277,953 | Christensen | Mar. 31, 1942 |
| 2,316,875 | Laboulais | Apr. 20, 1943 |
| 2,526,636 | Colman | Oct. 24, 1950 |
| 2,607,830 | Razek | Aug. 19, 1952 |
| 2,666,896 | Harris | Jan. 19, 1954 |
| 2,824,282 | Posey | Feb. 18, 1958 |
| 2,852,740 | Posey et al. | Sept. 16, 1958 |
| 2,863,191 | Dietert et al. | Dec. 9, 1958 |

FOREIGN PATENTS

| | | |
|---|---|---|
| 600,210 | Great Britain | Apr. 2, 1948 |